US008228695B2

(12) United States Patent
Roesner et al.

(10) Patent No.: US 8,228,695 B2
(45) Date of Patent: Jul. 24, 2012

(54) MULTILEVEL CONVERTER OPERATION

(75) Inventors: Robert Roesner, Unterfoehring (DE); Stefan Schroeder, Munich (DE); Jie Shen, Ingolstadt (DE)

(73) Assignee: General Electric Company, Niskayuna, NY (US)

( * ) Notice: Subject to any disclaimer, the term of this patent is extended or adjusted under 35 U.S.C. 154(b) by 151 days.

(21) Appl. No.: 12/618,810

(22) Filed: Nov. 16, 2009

(65) Prior Publication Data

US 2011/0115532 A1    May 19, 2011

(51) Int. Cl.
*H02M 7/122* (2006.01)
(52) U.S. Cl. .................. 363/56.01; 363/131
(58) Field of Classification Search .......... 363/40, 363/41, 50, 56.01, 56.02, 131, 132
See application file for complete search history.

(56) References Cited

U.S. PATENT DOCUMENTS

| | | | |
|---|---|---|---|
| 6,219,265 B1 | 4/2001 | Bernet et al. | |
| 6,226,192 B1 | 5/2001 | Yamanaka et al. | |
| 6,490,185 B1 * | 12/2002 | Yamanaka et al. | 363/98 |
| 6,697,274 B2 | 2/2004 | Bernet et al. | |
| 6,930,899 B2 | 8/2005 | Bakran et al. | |
| 7,206,211 B2 * | 4/2007 | Blidberg et al. | 363/132 |
| 7,430,132 B2 * | 9/2008 | Morishita | 363/55 |
| 2011/0013438 A1 * | 1/2011 | Frisch et al. | 363/131 |
| 2011/0280055 A1 * | 11/2011 | Nielsen | 363/131 |

FOREIGN PATENT DOCUMENTS

| | | | |
|---|---|---|---|
| EP | 1443648 A1 | | 1/2003 |
| JP | 2005176538 A | * | 6/2005 |
| WO | 0231956 A1 | | 4/2002 |

OTHER PUBLICATIONS

English translation of Japan JP2005-176538.*
EP10190088 Search Report, Mar. 30, 2011.
T. Bruckner et al., "The Active NPC Converter for Medium-Voltage Applications," IEEE 2005 Industry Applications Conference Fortieth IAS Annual Meeting Oct. 2-6, 2005, vol. 1, No. 5, pp. 84-91.

* cited by examiner

*Primary Examiner* — Adolf Berhane
(74) *Attorney, Agent, or Firm* — Ann M. Agosti (57) ABSTRACT

A method of operating a neutral point clamped (NPC) three level converter is provided. The NPC converter includes at least two legs, each leg comprising first and second top switches connected in series at a first mid point. The converter further includes first and second bottom switches connected in series at a second mid point, and first and second middle switches connected in series at a third mid point therebetween. The first top and second bottom switches are connected in series at a DC link and the first and the second middle switches are connected between the first and the second mid points. Each of the top, bottom and middle switches has an antiparallel diode thereacross. The method includes alternately switching the first and second top switches to ON state when the first middle switch is in ON state and the second middle switch is in OFF state. The method also includes alternately switching the first and the second bottom switches to ON state when the first middle switch is in OFF state and the second middle switch is in ON state.

20 Claims, 6 Drawing Sheets

MULTILEVEL CONVERTER OPERATION

BACKGROUND

This invention relates generally to a neutral point clamped (NPC) or diode clamped multilevel converter, and, more specifically, to a method of operation of a multilevel converter.

A diode clamped multilevel converter is generally used in high power industrial applications such as variable speed drive (VSD) systems or in energy conversion applications such as a solar (or photovoltaic) power generating systems or wind turbine generators. Power losses of diode clamped multilevel converters are an important issue in unit sizing of drive systems and photovoltaic systems because of the influence of such losses on the total deliverable energy. Power losses occur in multilevel converters mainly because of losses in switching devices such as Insulated Gate Bipolar Transistors (IGBTs), Gate Turn Off (GTO) Thyristors, and Integrated Gate Commuted Thyristors (IGCTs), which are generally used in such converters. Power losses also occur in the converters due to the presence of clamping diodes and passive components such as filter inductors.

Clamping diodes may be used in multilevel converters to block or clamp the voltage across the switching devices to a certain level. For reasons of modularity and simplification, IGBT modules are frequently used in place of neutral-point clamped diodes to perform the blocking function. In such embodiments, the IGBTs are constantly gated off. Whether diode modules or IGBT modules are used, each of them has some internal inductance, which further increases power losses in a converter during commutation of switching devices.

The switching devices generally have three major types of losses: conduction losses, switching losses, and gate drive losses. The switching losses correspond to the losses that occur during state changes of the switching device (during turn on and turn off). The conduction losses correspond to losses that occur in the switching device during its conduction (when the device is carrying a current). Gate drive losses refer to the energy required to charge and discharge gate-source and gate-drain capacitances of the switching devices and are affected by switching frequency, gate capacitance, and the voltage traversed. However, usually switching losses and conduction losses are the major factors in high power IGBT applications.

Therefore, it is desirable to provide a method and a system that will address the foregoing issues.

BRIEF DESCRIPTION

In accordance with an embodiment of the present invention, a method for operating a neutral point clamped (NPC) three level converter is provided. The NPC three level converter includes at least two legs, each of the leg comprises first and second top switches connected in series at a first mid point, first and second bottom switches connected in series at a second mid point and first and second middle switches connected in series at a third mid point therebetween. The first top and the second bottom switches are connected in series at a DC link and the first and the second middle switches are connected between the first and second mid points. Each of the top, bottom and middle switches has an antiparallel diodes thereacross. The method includes alternately switching the first and second top switches to ON state when the first middle switch is in ON state and the second middle switch is in OFF state. The method further includes alternately switching the first and the second bottom switches to ON state when the first middle switch is in OFF state and the second middle switch is in ON state.

In accordance with another embodiment of the present invention, a method of operating a NPC multilevel converter is provided. The NPC multilevel converter includes at least two legs, each of the leg comprises first and second top switching devices connected in series at a first mid point, first and second bottom switching devices connected in series at a second mid point and first and second middle switching devices connected in series at a third mid point therebetween. The first top and the second bottom switching devices are connected in series at a split DC link and the first and the second middle switches are connected between the first and second mid points. Each of the top, bottom and middle switches has an antiparallel diodes thereacross. The method includes providing a first commutation path for the first top switching device through the antiparallel diode of the second top switching device, a top capacitor of the split DC link and the first top switching device. A second commutation path for the second bottom switching device is provided through the antiparallel diode of the first bottom switching device, a bottom capacitor of the split DC link and the second bottom switching device. The method also includes providing a third commutation path for the second top switching device through the antiparallel diode of the first top switching device, a top capacitor of the split DC link and the second top switching device. The method further includes providing a fourth commutation path for the first bottom switching device through the antiparallel diode of the second bottom switching device, a bottom capacitor of the split DC link and the first bottom switching device.

In accordance with yet another embodiment of the present invention, a pulse generation module for a NPC multilevel converter is provided. The NPC multilevel converter includes at least two legs, each of the leg comprises first and second top switching devices connected in series at a first mid point, first and second bottom switching devices connected in series at a second mid point and first and second middle switching devices connected in series at a third mid point therebetween. The first top and the second bottom switching devices are connected in series at a DC link and the first and the second middle switching devices are connected between the first and second mid points. Each of the top, bottom and middle switching devices has an antiparallel diodes thereacross. The pulse generation module includes a first comparator to compare a reference sine waveform with a triangular waveform to generate switching pulses for the first and the second top switching devices and a second comparator for comparing the reference sine waveform with a phase shifted triangular waveform to generate switching pulses for the first and the second bottom switching devices. The module further includes a third comparator to compare the reference sine waveform with a zero voltage waveform to generate switching pulses for the first and the second middle switching devices.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention enable a multilevel converter to convert a direct current (DC) power into an alternating current (AC) power in an optimized manner.

Figure 1:
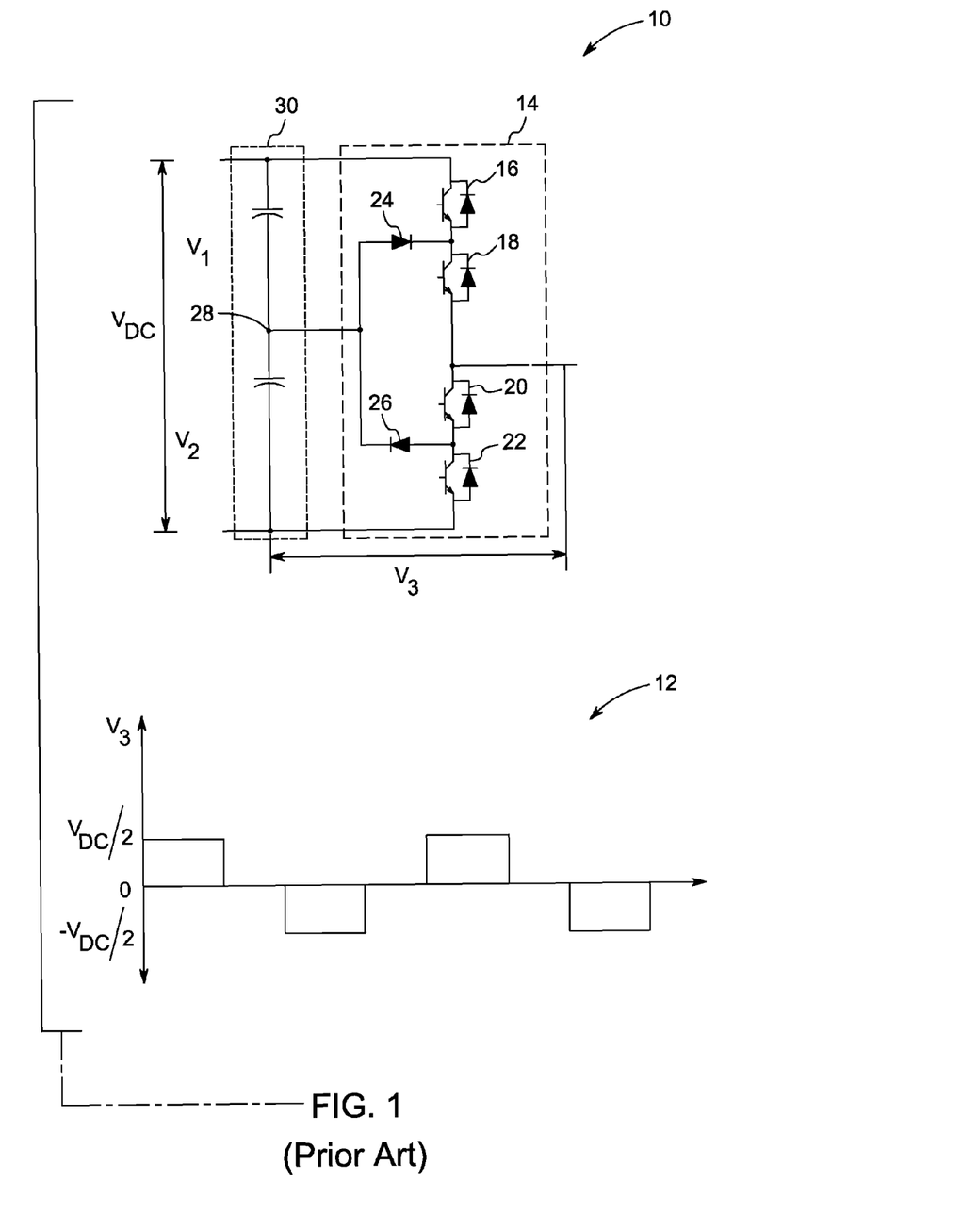
FIG. 1 is a circuit diagram of one phase leg of a conventional neutral point clamped multilevel converter and an output waveform.

FIG. 1 illustrates a schematic 10 of one leg or one phase of a conventional neutral point clamped (NPC) or diode clamped three level converter and its output waveform 12. One leg 14 of the three-level converter includes four switching devices 16, 18, 20 and 22 and two diodes 24 and 26. Input voltages V1 and V2 are controlled to maintain at a voltage equal to Vdc/2, where Vdc is the total DC link voltage. Voltage V3 is the phase A output voltage measured with respect to a center point 28 of DC link 30. Device 16 is complementary to device 20 so that, when the device 16 is conducting, device 20 is not conducting and vice versa. Similarly, devices 18 and 22 are complementary.

In operation, each leg of the NPC three level converter has three switching stages. In the first switching stage, devices 16 and 18 are turned on and devices 20 and 22 are turned off. Assuming a stable operation, V1=V2=Vdc/2, and V3 becomes Vdc/2. In the second switching stage, devices 18 and 20 are turned on while devices 16 and 22 are turned off. In this stage, V3 is equal to zero. In the third switching stage, devices 16 and 18 are turned off whereas devices 20 and 22 are turned on. This results in V3 becoming −Vdc/2 as shown in a waveform 12. Thus, it can be seen that the phase voltage V3 has three levels Vdc/2, −Vdc/2 and 0. When all three legs of the NPC three-phase converter are combined then the resulting line to line voltages have five levels namely Vdc, Vdc/2, 0, −Vdc/2 and −Vdc. The three-level converter 14 of FIG. 1 may be increased to any level depending on the circuit topology and number of devices and diodes in the circuit. As the number of levels in the converter increases, the output waveform of the converter approaches a pure sine wave, resulting in lower harmonics in the output voltage.

Figure 2:
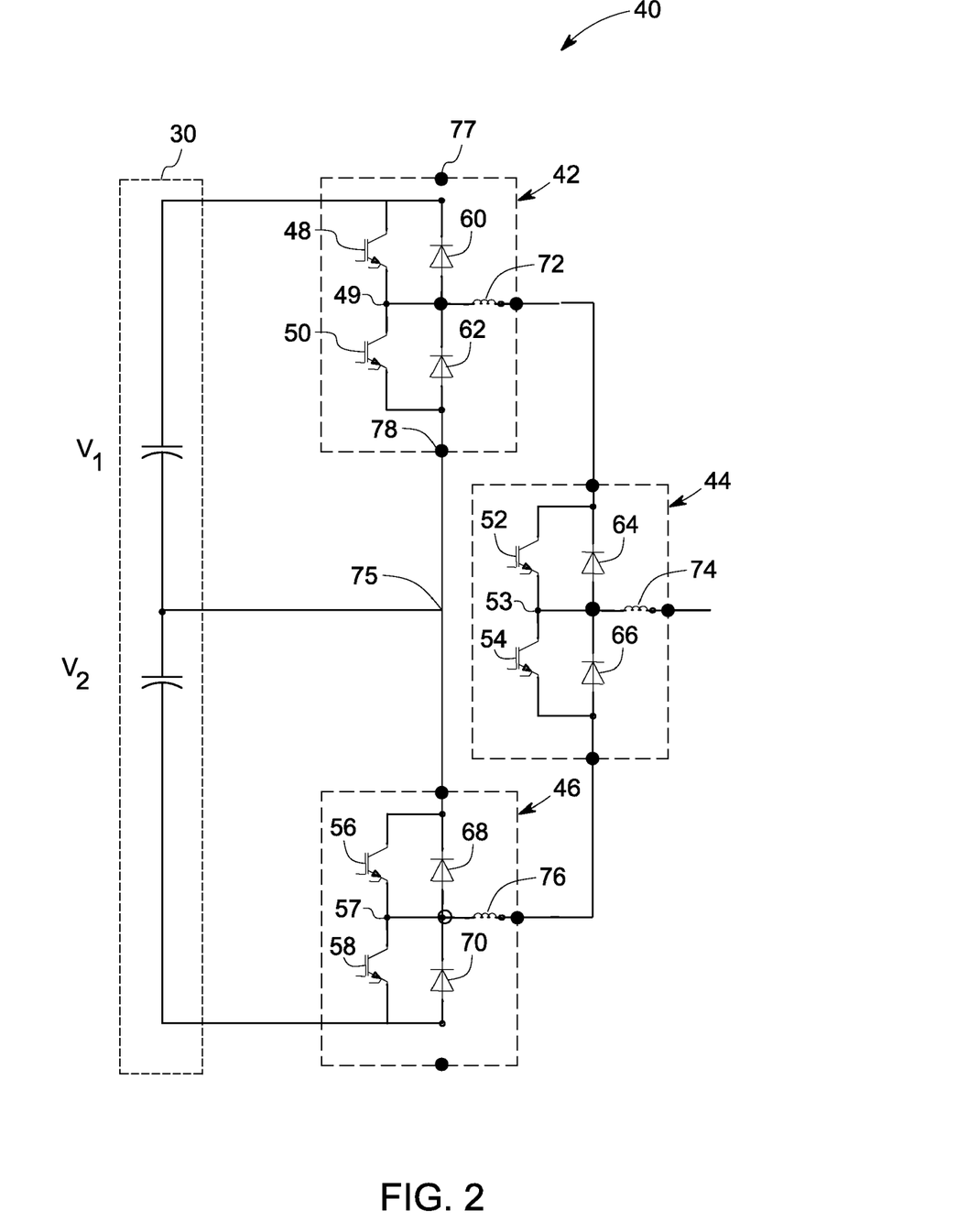
FIG. 2 is a circuit diagram of one phase leg of another embodiment of a neutral point clamped multilevel converter.

FIG. 2 illustrates a circuit diagram 40 of one leg of a NPC three level converter utilizing IGBT modules. The converter 40 includes three dual IGBT modules 42, 44, 46 for each leg of the converter. Thus, for a three-phase converter, nine dual IGBT modules are used. The dual IGBT modules are easily available in the market, and each of the dual IGBT modules 42, 44, 46 comprises two IGBTs (IGBTs 48, 50 for top IGBT module, 52, 54 for middle IGBT module and 56, 58 for bottom IGBT module). The two IGBTs of each of the IGBT modules are connected in series and provide a first mid point 49, a second mid point 53, and a third point 57. IGBTs modules include anti-parallel diodes connected across the midpoints (shown as 60, 62, 64, 66, 68, 70). Dual IGBT modules are usually optimized for operation in a standard two level inverter circuit. The leakage inductance associated with the positive terminal 80 and the negative terminal 81 is low compared to the leakage inductance associated with the mid point (72). In a standard two level application, the leakage inductance of the mid point terminal (72) is not critical, and therefore the manufacturer does not optimize the internal module design to address this leakage inductance. The top and bottom IGBT modules are connected in series and form a fourth mid point 75 which is connected to the mid point of the DC link.

Figure 3:
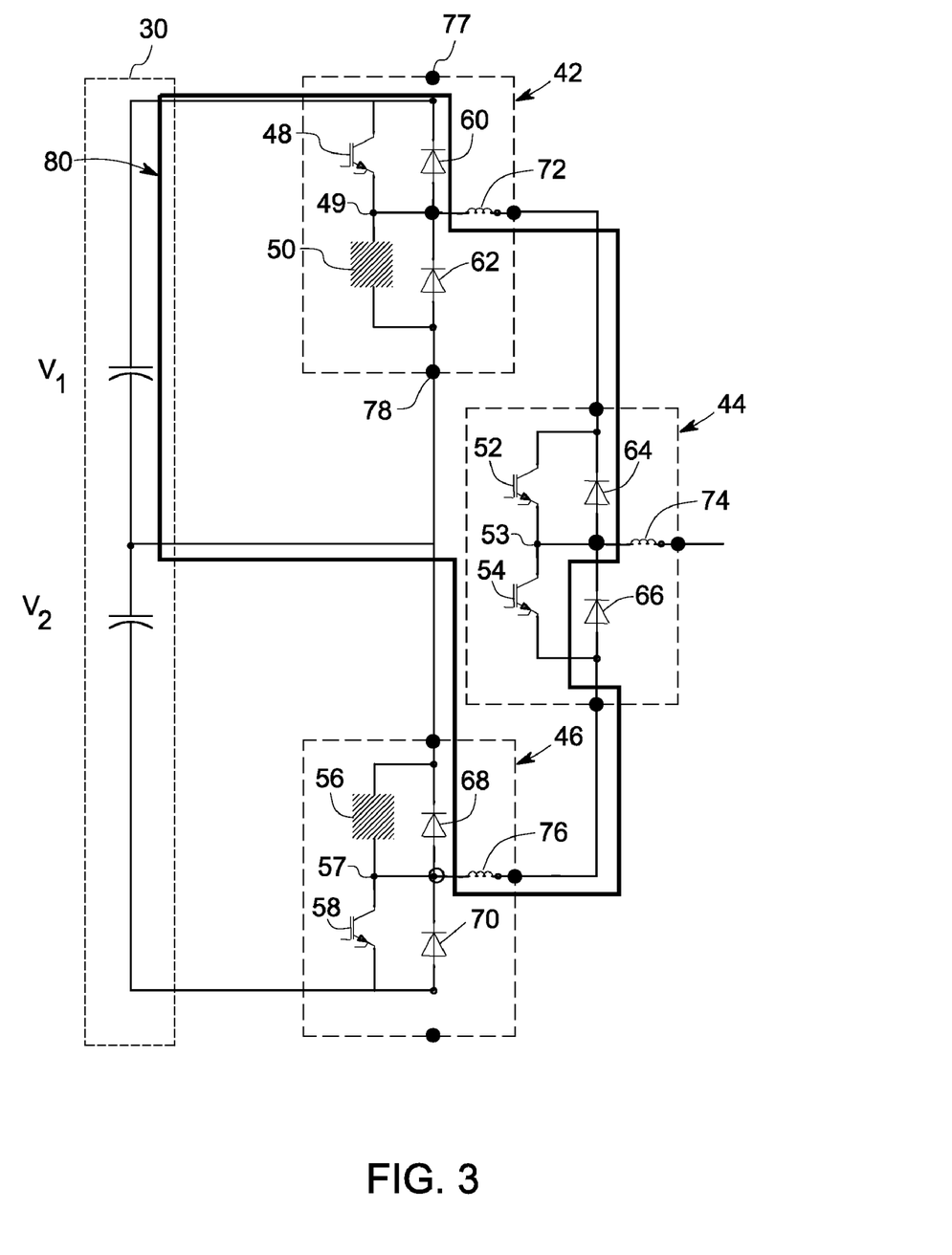
FIG. 3 is a diagrammatical representation of conventional operation of the multilevel converter of FIG. 2.

FIG. 3 illustrates one conventional mode of operation of the three level converter of FIG. 2. In operation, the bottom IGBT 50 of the top dual IGBT module 42 and the top IGBT 56 of the bottom dual IGBT module 46 are turned OFF (or disabled) continuously. Thus, only anti-parallel diodes 62, 68 across these IGBTs are active during the operation of the converter. This results in a circuit similar to the schematic of FIG. 1 except for the three leakage inductors 72, 74 and 76. Switching or operation of the remaining IGBTs is then performed in a similar to as explained with respect to the schematic of FIG. 1 except that a challenge occurs during commutation (or turn off) processes of the IGBTs 54. FIG. 3 shows a current commutation path 80 of the top IGBT module 42. It can be seen that the current commutates through the top diode 60 of the top IGBT module 42, top capacitor of the DC link 30, top diode 68 of the bottom IGBT module 46, leakage inductor 76 of the bottom IGBT module 46, bottom IGBT 54 of the middle IGBT module 44, top diode 64 of the middle IGBT module 44 and the leakage inductor 72 of the top IGBT module 42. Thus, there are two leakage inductors in the commutation path of the top IGBT, which results in power losses in the converter affecting the efficiency and size of the converter. Furthermore the switching during turn-off of the IGBT is affected by the leakage inductance of the commutation loop. With increasing leakage the switching speed has to be reduced to keep the IGBT peak voltage within the limits of the device. Reducing switching speed tends to further increase the turn-off losses.

Figure 4:
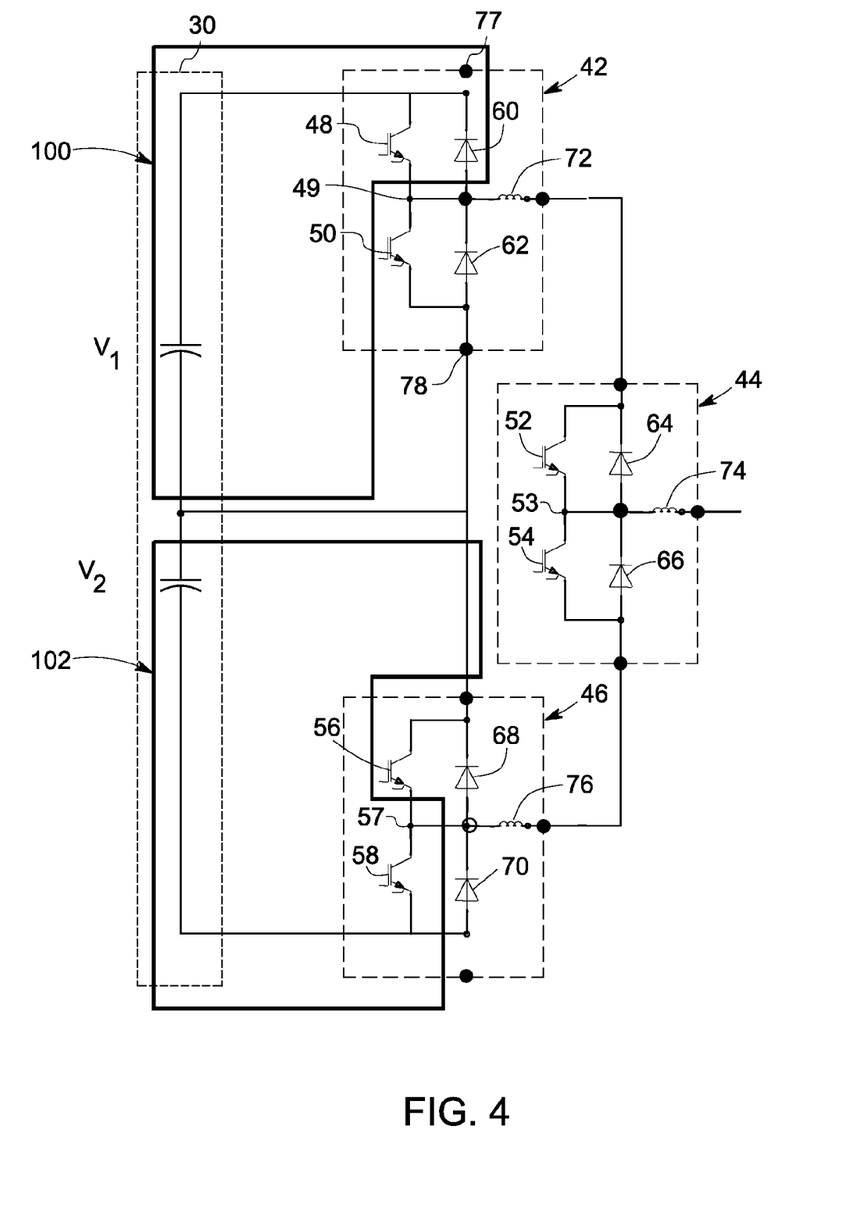
FIG. 4 is a diagrammatical representation of operation of the multilevel converter of FIG. 2 in accordance with an embodiment of the present invention.

FIG. 4 illustrates a method of operation of the three level converter of FIG. 2 in accordance with an embodiment of the present invention. In this operation, IGBTs 50 and 56 are not disabled and instead are switched with pulse width modulation (PWM). Additionally, IGBTs 52 and 54 are turned on alternately and PWM switching is done for remaining IGBTs 48 and 58. In this embodiment, IGBTs 48 and 50 are complementary of each other and similarly IGBT 56 is complementary of IGBT 58. For example, when IGBT 48 is conducting, IGBT 50 is not conducting and when IGBT 50 is conducting, IGBT 48 is not conducting. However, IGBTs 48 and 54 and IGBTs 52 and 58 are not complementary pairs in this embodiment. IGBTs 48 and 54 and similarly IGBTs 52 and 58 may not be in ON state simultaneously, but both IGBTs may be in OFF state simultaneously. Further, non-PWM switching of middle IGBTs 52 and 54 may also result in reduction in power losses of the converter. It should be noted that even though IGBTs are illustrated as the switching devices herein, other switching devices such as IGCTs, MCTs, MTOs MOSFETs and may additionally or alternatively be used. Such devices may be fabricated from any suitable semiconductor material with silicon and silicon carbide being two non-limiting examples. In one embodiment, the converter may be made up off series stacked single or three phase converters in any combination. Also, in yet another embodiment, PWM switching may be utilized for middle IGBTs 52 and 54. During operation, the IGBTs 48 and 56 are continuously on for a positive half cycle of the output sine wave and IGBTs 50 and 58 are off during the same half cycle. In this case the dual IGBT 44 is connected to the upper half of the dc bus (V1).

Similar principles are applied for the negative half cycle with IGBTs 50 and 58 being kept on and IGBTs 48 and 56 being kept off.

FIG. 4 further shows a current commutation path 100 of the bottom IGBT 50 of the top IGBT module 42. It can be seen that the current commutates through the top diode 60 of the top IGBT module 42, the top capacitor of the DC link 30 and the bottom IGBT 50 of the top IGBT module 42. Thus, there is no mid point associated leakage inductor 72 or 76 in the commutation path of the top IGBT 48, which results in significant reduction in power losses compared to more conventional methods of operating three level converters. The reduction in power losses also results in reduction in associated heating of the three level converter and thus the cooling needs and size requirements of the converter. The reduction in switching losses may also be employed to increase the switching frequency to reduce size and cost of passive filter components. FIG. 4 also shows a current commutation path 102 for the top IGBT 56 of the bottom IGBT module 46. The current commutates through the diode 70, the IGBT 56 and the bottom capacitor of the DC link. Other commutation paths not shown in the figures are commutation paths for IGBTs 48 and 58. In one path, for example, the IGBT 48 commutates through the bottom diode 62 of the top IGBT module 42, the top capacitor of the DC link 30 and the IGBT 48. In another path, the IGBT 58 commutates through the diode 68, the IGBT 58 and the bottom capacitor of the DC link. Further, it will be appreciated by those skilled in the art, even though the operation is explained with respect to only one leg, similar operation may be performed for other legs of multi level converters.

Figure 5:
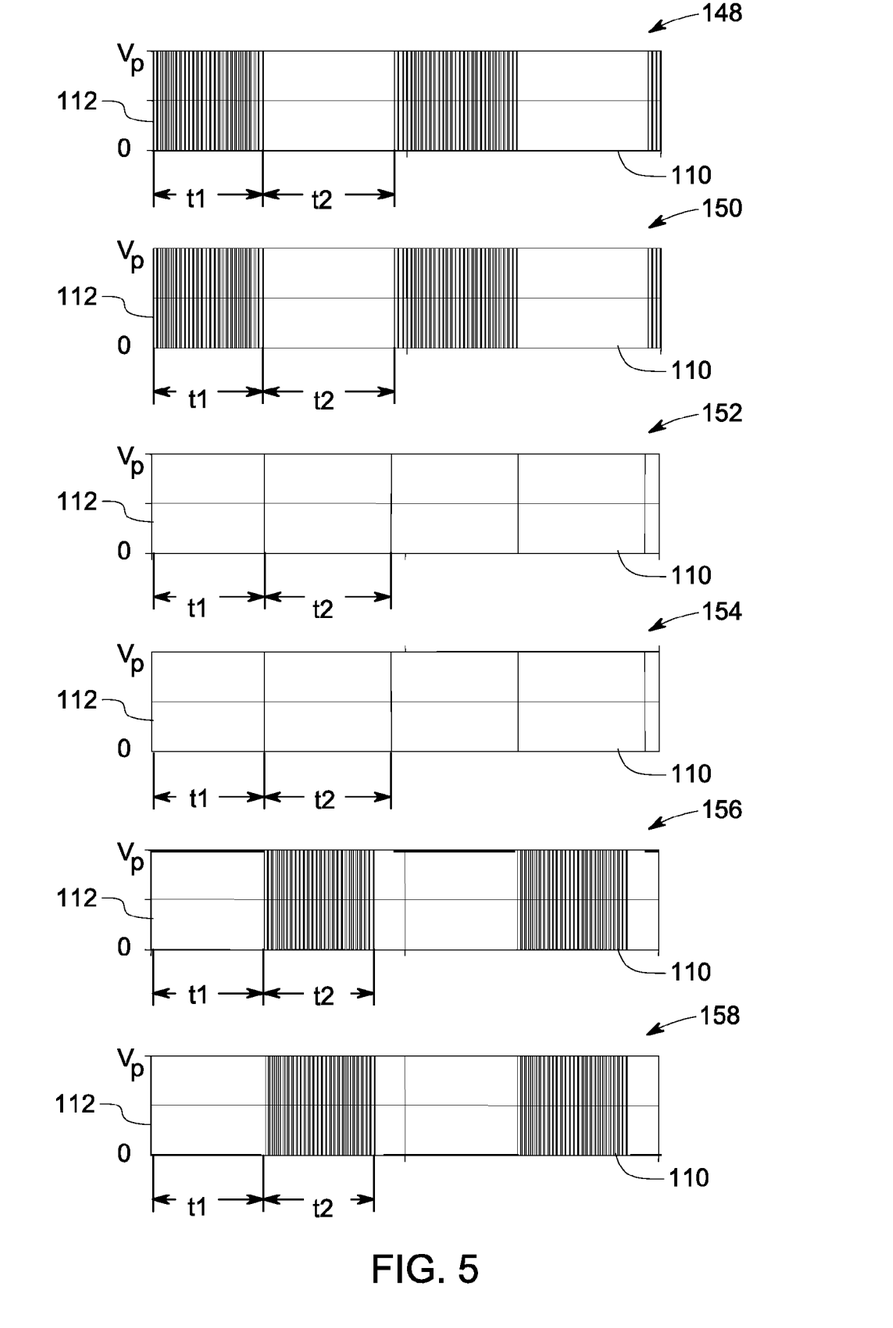
FIG. 5 is a graph illustrating PWM pulses for the multilevel converter of FIG. 2 in accordance with the embodiment FIG. 4.

FIG. 5 represents PWM pulses for the multilevel converter of FIG. 2 in accordance with an embodiment of the present invention. It shows six switching pulse patterns 148, 150, 152, 154, 156 and 158 for six IGBTs 48, 50, 52, 54, 56 and 58 respectively, distributed over two time segments t1 and t2. The horizontal axis 110 of switching pulses represents time t, whereas vertical axis 112 of switching pulses represents a pulse voltage Vp. In one embodiment, the pulse voltage Vp may be 5 volts or 15 volts. As described earlier, the IGBTs 48 and 50 are complementary of each other and thus the pulses 148 and 150 are also complementary of each other i.e., when pulse 148 is high, pulse 150 is low and when pulse 148 is low, pulse 150 is high. Similarly, pulses 152 and 154 are complementary of each other and pulses 156 and 158 are complementary. During the time period t1, the pulse 152 is high and pulse 154 is low and thus corresponding IGBT 52 is ON while IGBT 54 is OFF. Similarly, during t1, pulse 156 is high and pulse 158 is low and corresponding IGBTs 56, 58 are ON and OFF respectively. Furthermore, the switching pulses 148 and 150 for IGBTs 48 and 50 are PWM pulses as the IGBT 48 is carrying load current during the time period t1. In general, pulses 148, 150, 156 and 158 are PWM pulses whereas pulses 152 and 154 are non PWM pulses and pulse pairs 148-150, 152-154, 156-158 are complementary.

During the time period t2, the bottom IGBT 58 is carrying load current and thus the pulses 156 and 158 for IGBTs 56 and 58 are PWM pulses, whereas the top IGBT is turned OFF, hence pulse 148 is low and pulse 150 is high. Furthermore, pulse 152 is low and pulse 154 is high. Time periods t1 and t2 together complete one cycle of the operation and it is also a time period of the fundamental frequency. The operation continues thereafter with similar repetitive other cycles.

Figure 6:
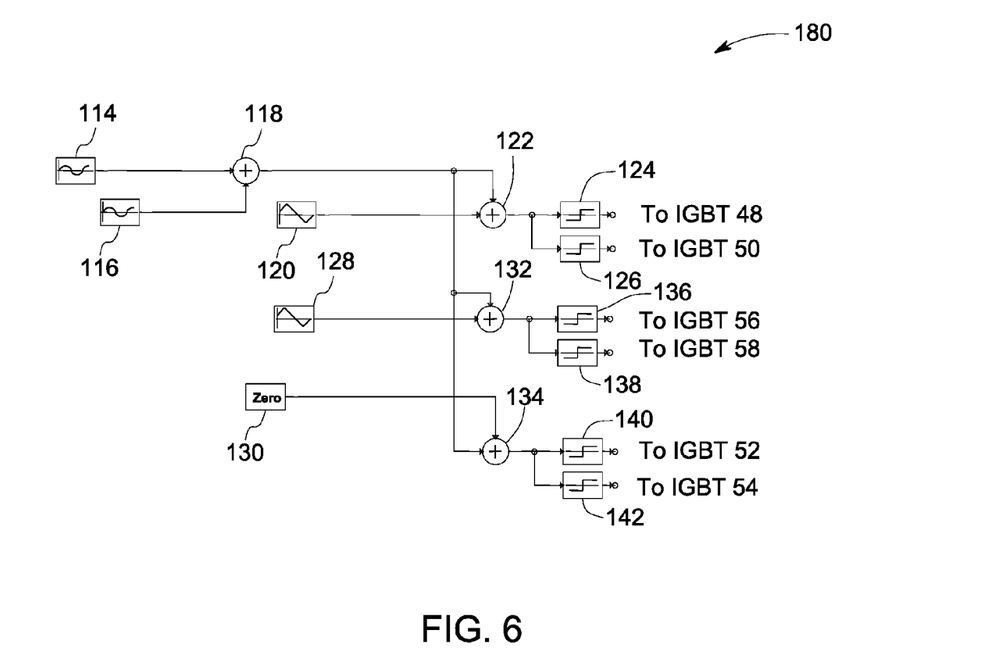
FIG. 6 is a block diagram of a pulse generation module for the multilevel converter of FIG. 2 in accordance with an embodiment of the present invention.

FIG. 6 is a block diagram of one possible embodiment of a sine triangle pulse generation module 140 for the multilevel converter in accordance with an embodiment of the present invention. The pulses generated by the pulse generation module 140 are basically the same as shown in FIG. 5. The module includes a reference sine wave voltage source 114. The reference sine wave 114 is a normalized phase voltage to be generated by one leg of the multilevel converter. Thus, the frequency of the reference sine wave is a fundamental frequency i.e. 50 Hz or 60 Hz. In one embodiment, the reference sine wave 114 is produced by an outer controller (not shown) of the multilevel converter. A third harmonic waveform 116 may then be added to the reference sine wave 114 by a summer block 118. The frequency of the third harmonic voltage source is typically 150 Hz or 180 Hz depending on the fundamental frequency. The output of the summer block 118 is then compared with a first triangular waveform 120 by a comparator 122. The triangular waveform is of high frequency such as 2 kHz to 200 kHz. In one embodiment, the comparator 122 provides a high signal output if the instantaneous triangular waveform value is higher than the instantaneous reference sine wave value and provides a low signal output if the instantaneous triangular waveform value is lower than the instantaneous reference sine wave value. The output of the comparator 122 is provided to the IGBT 48. In one embodiment, the output of the comparator is provided to the IGBT 48 via a buffer block 124 and a gate drive circuit (not shown). The inverted output of the comparator 122 is provided to the IGBT 50 through an inverter buffer 126.

The output of the summer 118 is also compared with a second triangular waveform 128 and a zero voltage waveform 130 via comparators 132 and 134 respectively. The second triangular waveform is phase shifted with respect to the first triangular waveform by an angle of 180°. Thus, when the first triangular waveform is positive, the second triangular waveform is negative and vice versa. The comparison of triangular waveforms 120 and 128 with the output of the summer 118 provides PWM pulses for outer IGBTs 48, 50, 56, and 58 whereas comparison of zero voltage waveform 130 with the output of the summer 118 provides non-PWM pulses for middle IGBTs 52 and 54. Non-inverted output waveforms of comparators 132 and 134 are then provided to IGBTs 56 and 52 via buffers 136 and 140 respectively. Similarly, inverted output waveforms of comparators 132 and 134 are provided to IGBTs 58 and 54 via inverter buffers 138 and 142 respectively. It should be noted that even though only sine triangular pulse width modulation (PWM) waveform generation has been explained here, other PWM techniques such as space vector PWM are very much in scope of the present control method. It should be noted that even though the description is related to only three level converters, the method may be used for other multilevel converters such as five level converters or seven level converters.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a neutral point clamped three level converter comprising at least two legs, each leg comprising first and second top switches connected in series at a first mid point, first and second bottom switches connected in series at a second mid point, and first and second middle switches connected in series at a third mid point therebetween, wherein the first top and second bottom switches are connected in series at a DC link, the first and second middle switches are connected between the first and second mid points, and each of the top, bottom and middle switches has an antiparallel diode thereacross, the method comprising:

alternately switching the first and second top switches to ON state when the first middle switch is in ON state and the second middle switch is in OFF state; and alternately switching the first and second bottom switches to ON state when the first middle switch is in OFF state and the second middle switch is in ON state.

2. The method of claim 1, wherein the first top switch commutates through the antiparallel diode of the second top switch and a top capacitor of the DC link.

3. The method of claim 1, wherein the second bottom switch commutates through the antiparallel diode of the first bottom switch and a bottom capacitor of the DC link.

4. The method of claim 1, wherein switching pulses for the first and second top switches are complementary of each other.

5. The method of claim 1, wherein switching pulses for the first and second bottom switches are complementary of each other.

6. The method of claim 1, wherein the switching pulses for first and second middle switches are complementary of each other.

7. The method of claim 6, wherein the first middle switch is turned on and the second middle switch is turned off when the first middle switch is carrying the load current.

8. The method of claim 1, wherein the switching pulses for the first and second top and bottom switches are generated by comparison of a sine wave and a triangular wave.

9. The method of claim 1, wherein switching pulses for some of the switches are generated by a pulse width technique (PWM) technique.

10. The method of claim 9, wherein switching pulses for the first and second top and first and second bottom switches are generated by the PWM technique.

11. The method of claim 10, wherein the PWM technique comprises sine triangular PWM or space vector PWM.

12. The method of claim 1, wherein the three level converter comprises a single phase three level converter.

13. The method of claim 1, wherein the three level converter comprises a three phase three level converter.

14. The method of claim 1 where the converter comprises a series stacked single phase converters or three phase converters in any combination.

15. The method of claim 1, wherein the switches are selected from the group consisting of IGBTs, IGCTs, MCTs, MTOs, and MOSFETS.

16. A pulse generation module for a neutral point clamped multilevel converter comprising at least two legs, each leg comprising first and second top switching devices connected in series at a first mid point, first and second bottom switching devices connected in series at a second mid point, and first and second middle switching devices connected in series at a third mid point, wherein the first top and second bottom switching devices are connected in series at a DC link, the first and second middle switching devices are connected between the first and second mid points, and wherein each of the top, bottom and middle switching devices has an antiparallel diode thereacross them, the module comprising:

a first comparator to compare a reference sine waveform with a triangular waveform to generate switching pulses for the first and the second top switching devices;

a second comparator to compare the reference sine waveform with a phase shifted triangular waveform to generate switching pulses for the first and the second bottom switching devices; and a third comparator to compare the reference sine waveform with a zero voltage waveform to generate switching pulses for the first and the second middle switching devices.

17. The pulse generation module of claim 16, wherein the reference sine waveform comprises a normalized phase voltage waveform to be generated by the multilevel converter.

18. The pulse generation module of claim 16, wherein the frequency of the reference sine waveform is a fundamental frequency.

19. The pulse generation module of claim 16, wherein the phase shifted triangular waveform is phase shifted with respect to the triangular waveform by an angle of 1800.

20. The pulse generation module of claim 16, wherein the triangular waveform and the phase shifted triangular waveform have a frequency in the range of 2 kHz to 200 kHz.

* * * * *

UNITED STATES PATENT AND TRADEMARK OFFICE
CERTIFICATE OF CORRECTION

| | | |
|---|---|---|
| PATENT NO. | : 8,228,695 B2 | Page 1 of 1 |
| APPLICATION NO. | : 12/618810 | |
| DATED | : July 24, 2012 | |
| INVENTOR(S) | : Roesner et al. | |

It is certified that error appears in the above-identified patent and that said Letters Patent is hereby corrected as shown below:

In Column 7, Line 28, in Claim 9, delete "technique" and insert -- modulation --, therefor.

In Column 8, Line 3, in Claim 15, delete "MOSFETS." and insert -- MOSFETs. --, therefor.

In Column 8, Line 35, in Claim 19, delete "1800." and insert -- 180°. --, therefor.

Signed and Sealed this
Second Day of October, 2012

David J. Kappos
*Director of the United States Patent and Trademark Office*